US012609492B2

(12) United States Patent
Schicklin et al.

(10) Patent No.: US 12,609,492 B2
(45) Date of Patent: Apr. 21, 2026

(54) ELECTRICAL CONNECTOR

(71) Applicant: Staubli Electrical Connectors AG, Allschwil (CH)

(72) Inventors: Tristan Schicklin, Blotzheim (FR); Yannick Nurdin, Walheim (FR)

(73) Assignee: Stäubli Electrical Connectors AG, Allschwil (CH)

( * ) Notice: Subject to any disclaimer, the term of this patent is extended or adjusted under 35 U.S.C. 154(b) by 310 days.

(21) Appl. No.: 18/276,190

(22) PCT Filed: Mar. 23, 2022

(86) PCT No.: PCT/EP2022/057674
§ 371 (c)(1),
(2) Date: Aug. 7, 2023

(87) PCT Pub. No.: WO2022/207433
PCT Pub. Date: Oct. 6, 2022

(65) Prior Publication Data

US 2024/0113478 A1 Apr. 4, 2024

(30) Foreign Application Priority Data

Mar. 30, 2021 (EP) .................................... 21165975

(51) Int. Cl.
*H01R 13/6596* (2011.01)
*H01R 13/514* (2006.01)

(52) U.S. Cl.
CPC ....... *H01R 13/6596* (2013.01); *H01R 13/514* (2013.01)

(58) Field of Classification Search
CPC .......................... H01R 13/6596; H01R 13/514
See application file for complete search history.

(56) References Cited

U.S. PATENT DOCUMENTS

2008/0293296 A1* 11/2008 Khemakhem .......... H04Q 1/116 439/578
2013/0078857 A1* 3/2013 Schull ................ H01R 13/6586 439/607.01
2013/0309894 A1 11/2013 Geng et al.

FOREIGN PATENT DOCUMENTS

EP 3 534 467 A1 9/2019
FR 3 022 701 A1 12/2015
(Continued)

OTHER PUBLICATIONS

English translation of FR 3022701 A1. (Year: 2014).*
International Search Report for PCT/EP2022/057674 dated Jun. 22, 2022 [PCT/ISA/210].

*Primary Examiner* — Sean Gugger
(74) *Attorney, Agent, or Firm* — Sughrue Mion, PLLC

(57) ABSTRACT

A connector unit having a first housing with a sidewall encompassing an interior space in which at least one electrical contact element is arranged, at least one further housing having a sidewall encompassing an interior space in which at least one electrical contact element is arranged, and a mounting element having openings. The housings have a mounting section via which mounting sections the first housing and the further housing are fixedly connected to the mounting element such that the first housing is allocated to a first opening and the further housing is allocated to a further opening. The housings have on the outside of the sidewall a latching structure The latching structure of the first housing is adapted to be latched in with the latching structure of the further housing in order to establish a mechanical connection between two housings.

24 Claims, 14 Drawing Sheets

(56) References Cited

FOREIGN PATENT DOCUMENTS

| | | | |
|---|---|---|---|
| JP | S48-44791 | B1 | 12/1973 |
| JP | 2007-511050 | A | 4/2007 |
| JP | 2013-528311 | A | 7/2013 |
| JP | 2014-510370 | A | 4/2014 |
| WO | 2006/115813 | A1 | 11/2006 |
| WO | 2011/154302 | A1 | 12/2011 |

* cited by examiner

ELECTRICAL CONNECTOR

CROSS REFERENCE TO RELATED APPLICATIONS

This application is a National Stage of International Application No. PCT/EP2022/057674 filed Mar. 23, 2022, claiming priority based on European Patent Application Ser. No. 21/165,975.0 filed Mar. 30, 2021.

TECHNICAL FIELD

The present invention relates to connector assembly according to the preamble of claim 1.

PRIOR ART

There are a plethora of connectors known from prior art. Such connectors usually comprise a pin-side to be connected to a plug-side and may serve for various purposes such as providing an electrical contact or establishing a fluid-tight connection in a pneumatic or hydraulic pipe system.

There are for example electrical connectors, which are used on railway carriages or to link railway carriages together such that there is an electrical contact provided in order to supply electrical appliances such as light etc. with electrical energy. Furthermore, such electrical connectors can be used for all on-board power applications such as inter-car connections, traction convertor outputs, motor connections, battery connections.

Furthermore, it is known from prior art that connectors may be arranged parallel to each other so that several connections are established with one single insertion operation. Such a connector assembly is for example known from EP 3 534 467. This prior art document discloses a connector which has various functions in terms of shielding properties as well as in terms of clamping properties of the cable.

The mechanical connection between the two housings is provided with a locking structure between two neighboring housing parts. Although the connection with locking structure provided very good results, it has been shown that in rough circumstances there is a risk that the housing might shift in the plug in direction.

SUMMARY OF THE INVENTION

In the present case it is an object of the present invention to provide an electrical connector which overcomes the drawbacks of prior art. In particular it is an object of the present invention to provide a connector unit which is provided in a robust manner against external forces, which in particular occur during the plugging process.

This object is solved by the connector unit according claim 1. A connector unit comprises a first housing having a sidewall encompassing an interior space in which at least one electrical contact element is arranged, at least one further housing having a sidewall encompassing an interior space in which at least one electrical contact element is arranged, and a mounting element having a first opening and at least a further opening. Said first housing comprises a mounting section and said further housing comprises a mounting section. Via the mounting sections said first housing and said further housing are fixedly connected to the mounting element such that said first housing is allocated to a first opening and such that said further housing is allocated to a further opening. Said first housing comprises on the outside of said sidewall a latching structure and said second housing comprises on the outside of said sidewall also a latching structure. Said latching structure of said first housing is adapted to be latched in with said latching structure of said further housing in order to establish a mechanical connection between two housings.

The connector unit comprises two connection points, which establish a mechanical connection. The first connection point is provided between the mounting element and the housings. The second connection point is provided between the two housings via the latching structure. As the mounting element serves as mechanical basis for the housings which are connected to the mounting element a shift of the housings along the middle axis due to forces during a plugging process can be prevented.

In other words, the mounting element serves as base bearing structure in order to support the first and the at least one further housing.

The term "at least one further housing" is to be understood as to include one or more than one housing. In case more than one housing is arranged as further housing, a first further housing is connected to the first housing and a second further housing is connected to the first further housing. Thereby the housings are arranged such to build a row of housings.

The first housing and the at least one further housing are preferably provided parallel to each other such that a row of housings are provided.

Preferably the number of openings in the mounting element corresponds to the number of housings. One housing is there allocated to one opening.

Concerning a direct connection between two neighbouring housings there is preferably exclusively one single latching connection provided with said latching structure. The only direct connection between the housings is provided by the latching structure and an indirect connection is provided by the connection via the mounting element.

In other words: The only mechanical connection between the housings is provided by the connection to the mounting element and said latching connection. This simplifies the overall structure of the connector unit. In particular, the assembly of the connector unit is simplified.

Preferably the mounting section of said housings is arranged at a front end of the respective housing and the latching structure is arranged in the region of the back end of the respective housing. This enhances the overall stability of the structure.

The back end is the end opposite the front end. In the region of the back end is to be understood that the latching structure is arranged as being closer to the back end than to front end. Preferably the latching structure is arranged in the rear third of the housing as seen from the front end.

In other words: Preferably the latching structure is arranged at a distance as seen from the mounting element.

The distances from the back end to the latching structure is identical among the housings in one connector unit.

Preferably each of the housing comprises two of said latching structures, namely a first latching structure arranged on one side of the sidewall and a second latching structure arranged on an other side of the sidewall that is opposite to said one side of the sidewall. In other words: One of the latching elements is arranged to the left side and the other latching element is arranged to the right side of the housing.

In case three housings are arranged, the middle housing engages with its first latching structure towards a first housing and with its second latching structure towards a third housing.

Preferably, the two latching structures are arranged at the same distance as seen from the back end. Preferably, the two latching structures are arranged mirror-symmetrically with regard to the middle axis extending through the respective interior space.

Preferably, all the latching elements have the same physical form.

Preferably the housing is made from a metallic material such as aluminium, stainless steel or copper alloy. In this case, the mechanical connection between the latching structures preferably and optionally also provide an electrically conductive connection between the housings. Therefore, the housings are connected on the same potential for electromagnetic shielding purposes.

Preferable the mounting element is made from a metal material such as aluminium, stainless steel or copper alloy. In case the housings are also made from a metallic material there is also an electrically conductive connection between the housings and the mounting element. Therefore, the housings and the mounting element can be easily connected to the ground.

In case both, the housings and the mounting element are made out of a conductive material, an electrical contact can be provided between the housings and the mounting element for shielding and/or earthing purposes. Additionally the two mounting elements of two connector units that are connected with each other may be electrically connected with each other for shielding and/or earthing purposes.

Alternatively, the housing and/or the mounting element may be made from a plastic material.

Preferably the latching structure provides a mechanical engagement between the first housing and the further housing such that housings are fixedly connected in terms of a movement perpendicular to said middle axes and wherein the mechanical engagement between the mounting section and the mounting element are fixedly connected in terms of a movement along said middle axes.

This means that the mechanical engagement between the housings provides a fixed engagement concerning two degrees of freedom and that the mechanical engagement between the housings and the mounting element provides a fixed engagement in one degree of freedom which is different from the other mentioned two degrees of freedom.

Preferably the latching structure comprises at least one groove section and at least one comb section, whereby the at least one comb section extends into the groove section in the connected state.

The at least one groove section and at least one comb section are of complementary shape such that the at least one groove section extends into and engages with the at least one comb section.

The connected state is the state when the first housing is connected to the further housing.

The comb section and the groove section are dimensioned such that the engagement between the latching structure of two neighbouring housings is a from closure. In a preferred embodiment there is a slight play between the comb section and the groove section allowing a facile mounting. In a other preferred embodiment there is a press fit between the comb section and the groove section. The press fit is preferably used when higher forces during the plugging process are expected.

The groove section and the comb section have preferably an undercut, which is arranged such that the connection between the groove section and the comb section cannot be separated in a direction perpendicular to the axis.

The groove section has preferably a base surface from which two side surfaces extend, which side surfaces are spaced apart from each other and which side surfaces are preferably oriented parallel to each other. Further, preferably at least one of the side surfaces are angularly tilted with regard to the base surface.

Preferably, the comb section has a base surface from which two side surfaces extend, which side surfaces are spaced apart from each other and which side surfaces are preferably oriented parallel to each other. Further, preferably at least on of side surfaces are angularly tilted with regard to the base surface.

In other embodiment the comb section and the groove section can also be provided by means of a rounded structure which is arranged such that the connection between the groove section and the comb section cannot be separated in a direction perpendicular to the axis.

Preferably, the mounting section has the shape of a flange extending radially away from the outer side of the housing, which flange has openings via which the first housing or the at least one further housing can be connected to the mounting element with a connection element, such as a screw.

Preferably, said openings in the flange are threaded openings to receive said screw. The mounting elements in this case comprises through openings via which the screw can be guided towards the threaded opening.

Preferably, the connector unit further comprising tubular elements. At least one tubular element is fixedly arranged in said interior space of each of the housings. The electrical contact element is preferably mechanically fastened to the tubular element by means of a mechanical fastening element. In one variant, the mechanical fastening element is at least one latching element. Thereby, the tubular element comprises at least one latching element to which the electrical contact element can be latched in. In a further variant, the mechanical fastening element is a locking ring that is provided between the tubular element and the electrical contact element.

Preferably the tubular element is made from an electrically insulating material, such as a plastic.

Preferably the tubular element and the housing engage with each other in a mechanical fixed manner.

Preferably, the tubular element has a section with a diameter that corresponds to the diameter of the openings in said mounting element, whereby the tubular element extends into and/or through said opening.

Preferably, the connector unit further comprises at least one side part. Said at least one side part extends from the mounting element in parallel direction to the housings. Said at least one side part is mechanically connected to the mounting element. Furthermore said at least one side part is mechanically connected to the housing which is arranged neighbouring or next to said side part.

Preferably the mounting element is electrically connected to the side parts. The side parts are electrically connectable to the ground. This means that the housings are grounded via the electrical connection to the mounting element and via the electrical connection between the mounting element and the side part.

Preferably, the side part has a latching structure which is provided such that the latching structure of the side part engages with the latching structures of the housings.

Preferably, two side parts are arranged, wherein a first side part is arranged sideways to one of the outermost housings and wherein a second side part is arranged sideways to the other one of the outermost housings.

Preferably, the housing comprises at its back end a cable gland to mechanically connected a cable to be introduced into the interior space to the housing. The cable gland preferably is also sealed against humidity, water, dust and the like. Furthermore, in case the housing is made from a metallic material, the housing comprises a contact surface to which a shielding braid of a cable can be connected, either directly or by means of shielding braid connection element.

Preferably, in each housing there is arranged one single pole. Alternatively it may also be possible that several poles are arranged in each housing.

Preferably the middle axis are straight axes such that the interior spaces extend along a straight direction.

It may also be possible that the middle axes have a bend such that a first part of the middle axes extend with an angle angularly tilted to a second part of the middle axes. Thereby it is possible to provide an angular connector unit.

Concerning different combinations it is possible:

to provide one side of a plug connection with a straight housing and to provide the other side with a straight housing; or to provide one side of a plug connection with a straight housing and to provide the other side with an angular housing; or to provide one side of a plug connection with an angular housing and to provide the other side with an angular housing.

A pin-side connector assembly comprising a connector unit according to the description above, wherein the electrical contact element is a pin-side electrical contact element comprising a pin-side contact section and a connection section to be connected to an electrical cable.

Preferably, the pin-side contact section extends over a front surface of the mounting element which front surface is arranged opposite to the housing.

Preferably the tubular element extends also over said front surface and encompasses the pin-side contact section.

A plug-side connector assembly comprising a connector unit according to the description above, wherein the electrical contact element is a plug-side electrical contact element comprising a plug-side contact section and a connection section to be connected to an electrical cable. The plug-side comprises a socket in which the pin-side can be plugged in.

The plug-side connector assembly and the pin-side connector assembly are connectable with each other.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

In the figures a connector unit according to a preferred embodiment according to the present invention is shown. The connector unit is preferably an electrical connector unit. The connector unit can be used for various applications. In the embodiments of FIGS. 1 to 10 the connector unit is shown as a straight connector and in the embodiments of FIGS. 11 to 14 the connector unit is shown as an angular connector.

Figure 1:
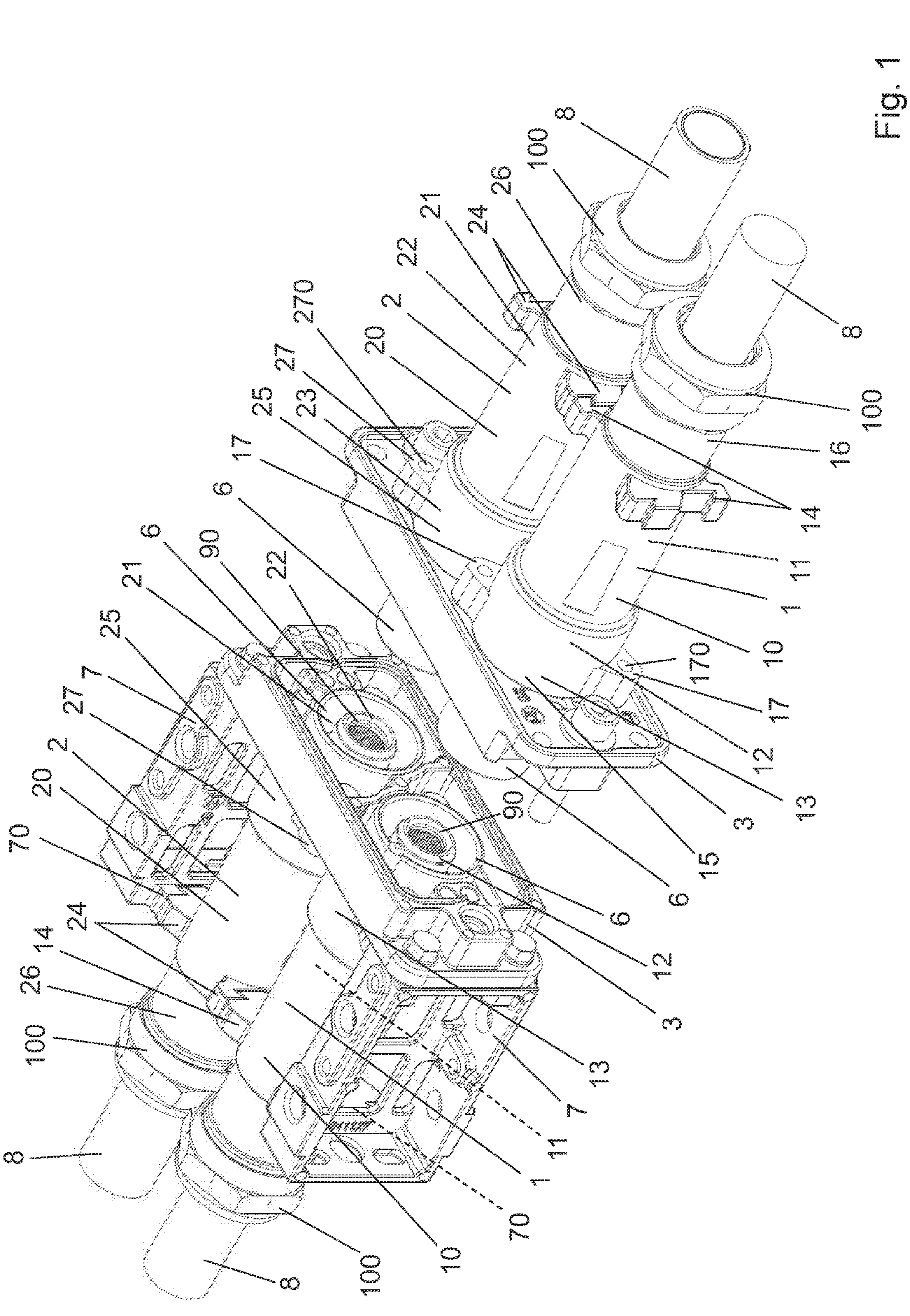
FIG. 1 shows a perspective view of two connector units according to preferred embodiments of the present invention.
Figure 2:
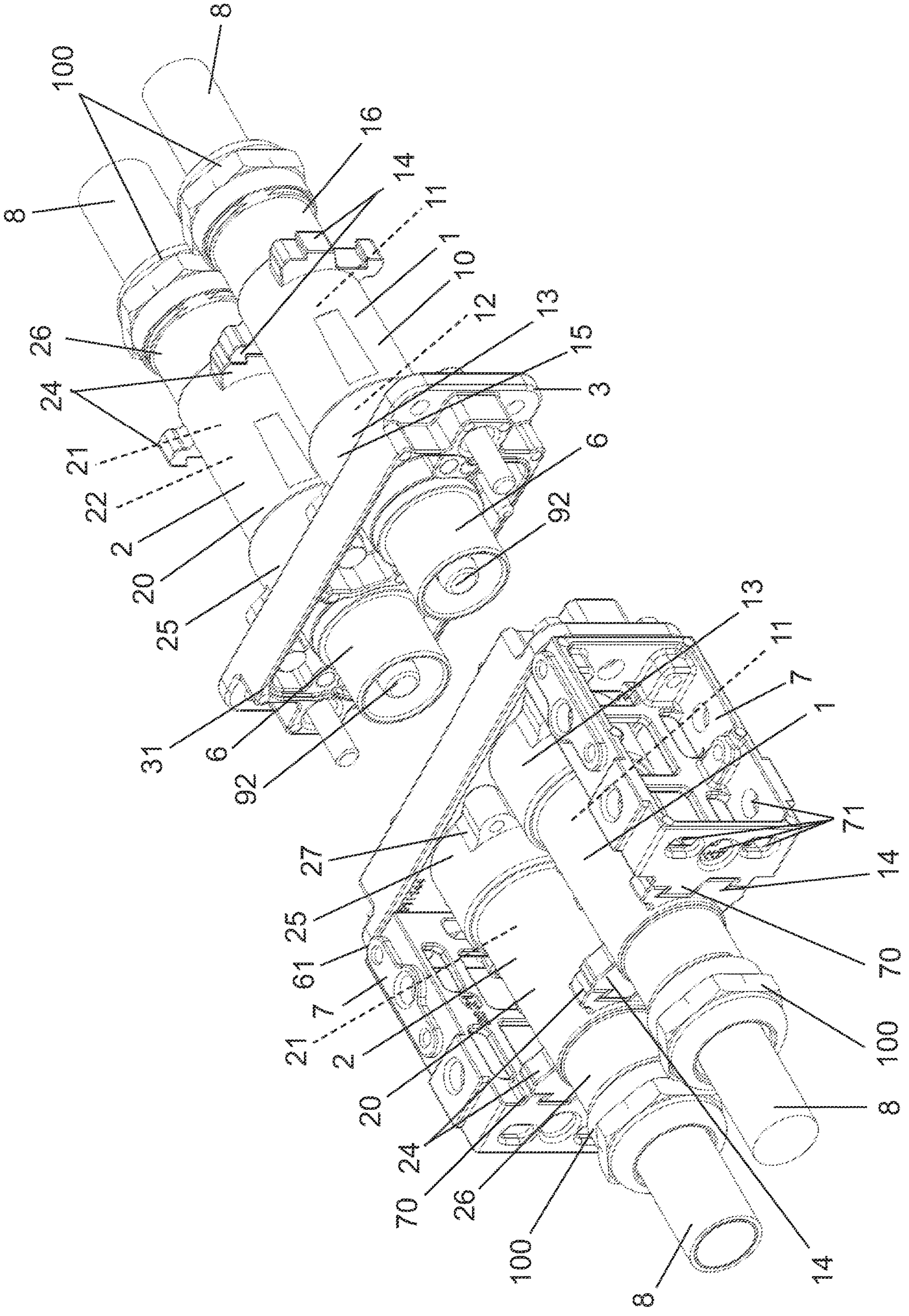
FIG. 2 shows a further perspective view of two connector units according to preferred embodiments of the present invention.

FIGS. 1 and 2 show a plug side connector assembly with the connector unit as well as a pin side connector assembly with the connector unit.

The connector unit is a multi-pole connector unit. This multi-pole connector unit has at least two different poles.

The connector unit comprises a first housing 1, at least one further housing 2 and a mounting element 3. The first housing 1 is arranged next to the further housing 2. In case an additional housing would be arranged, the additional housing would be arranged next to the further housing 2. The housings 1, 2 are connected to the mounting element 3 which is oriented transverse to the main extension direction of the housings 1, 2.

The first housing 1 and the further housing 2 are provided identical to each other. In the following the mechanical structure of the housing 1, 2 is outlined in more detail. The housing 1, 2 has a sidewall 10, 20 encompassing an interior space 11, 21. In the interior space 11, 21 at least one electrical contact element 12, 22 is arranged. Furthermore, the middle axis M1, M2 extends through the interior space 11, 21. The sidewall 10, 20 is a cylindrical sidewall having a circular cross-section and extends around said middle axis M1, M2. In other words the housing 1, 2 is of tubular shape. However, in other embodiments it is also possible to provide the housing 1, 2 with a different cross-section.

Two neighbouring housings, in the figures the first housing 1 and further housing 2 are mechanically connected with each other. In order to provide said mechanical connection the housing 1, 2 comprise a latching structure 14, 24. The latching structure 14, 24 is arranged on the outer surface of the sidewall 10, 20. The latching structure 14 of the first housing 1 engages with the latching structure 24 of the further housing 2. The latching structure 14 of the first housing 1 is adapted to be latched in with the latching structure 24 of the further housing 2 in order to provide the mechanical connection between the two housings 1, 2.

Furthermore the housing 1, 2 comprises a mounting section 13, 23. With the mounting section 13, 23 the housings 1, 2 are individually connected to the mounting element 3. The mounting element extends, as mentioned above, transversely to the middle axis M1, M2 of the housings 1, 2. The mounting element 3 comprises per housing 1, 2 one opening 30. Thereby one opening 30 is allocated to one housing 1, 2. In the present embodiment as shown in the figures there are two housings 1, 2 and there are two openings 30 in the mounting element 3. The interior space 11, 12 of the housing 1, 2 is accessible through the opening 30 of the mounting element 3.

As it can be seen from FIG. 1 and FIG. 2 the housings 1, 2 are in direct connection with each other by means of the latching structure 14, 24 and in indirect connection with each other via the mounting element 3. In this preferred embodiment, there is only one direct connection between the two neighbouring housings 1, 2. In other word there is exclusively one single latching connection between two neighbouring housings 1, 2. This one single latching connection is provided by the latching structure 14, 24.

In the present embodiment the mounting section 13, 23 is arranged at a front end 15, 25 of the respective housing 1, 2. The front end 15, 25 is the end which is directed towards the mounting element 3. The latching structure 14, 24 is thereby arranged in the region of the back end 16, 26 of the respective housing. The back end 16, 26 is the end which is arranged at the other end opposite to the front end 15, 25. In the present embodiment as shown in the figure the latching structure 14, 24 is arranged at a distance from the back end 16, 26.

In the present embodiment each of the housing 1, 2, comprises two latching structures 14, 24. The two latching structures 14, 24 are arranged on two sides of the sidewall 10, 20, namely on the left side and on the right side.

The latching structure 14, 24 is provided such that the mechanical engagement between the first housing 1 and the further housing 2 is such that the housings 1, 2, can be moved along the middle axis with regard to each other. Along this direction the latching structure 14 of the first housing 1 can be engaged into the latching structure 24 of the further housing 2. The latching structure 14, 24 is also provided such that a movement in a direction transverse to the middle axis M1, M2 is not possible or mechanically blocked, respectively. Furthermore as mentioned above the first housing 1 and the further housing 2 are connected to the mounting element 3. Via this connection the housings 1, 2 are mechanically fixed in terms of a possible movement along the middle axis M1, M2. In other words the mounting element 3 provides a fixed basis from which the first housing 1 and the further housing 2 extends.

Preferably, the mounting process is provided such that the first housing 1 is mechanically connected to the mounting element 3. Afterwards the further housing 2 slides with its latching structure 24 into engagement with the latching structure 14 of the first housing along the middle axis M2 towards the mounting element 3. The further housing 2 is then mechanically fixed to the mounting element 3.

Figure 4:
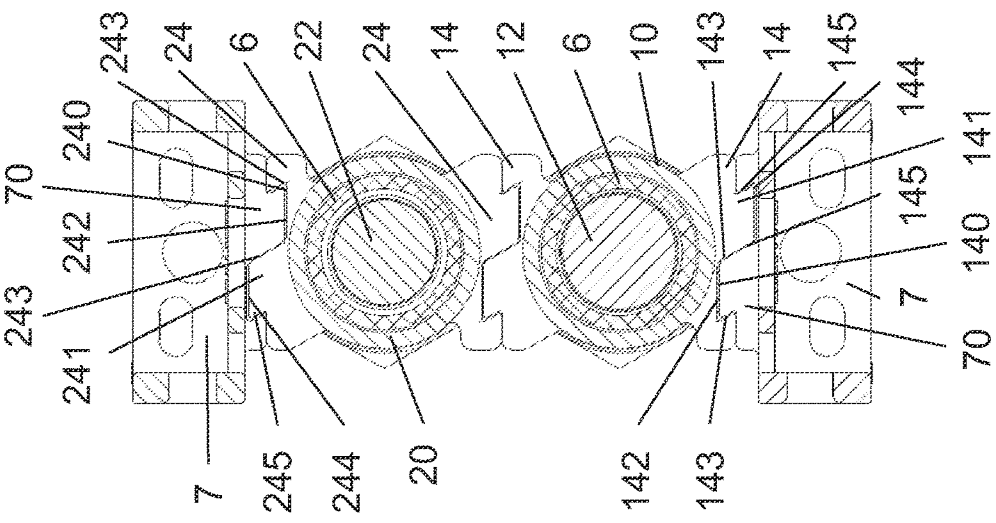
FIG. 4 shows a sectional view along section line IV-IV of FIG. 3.
Figure 3:
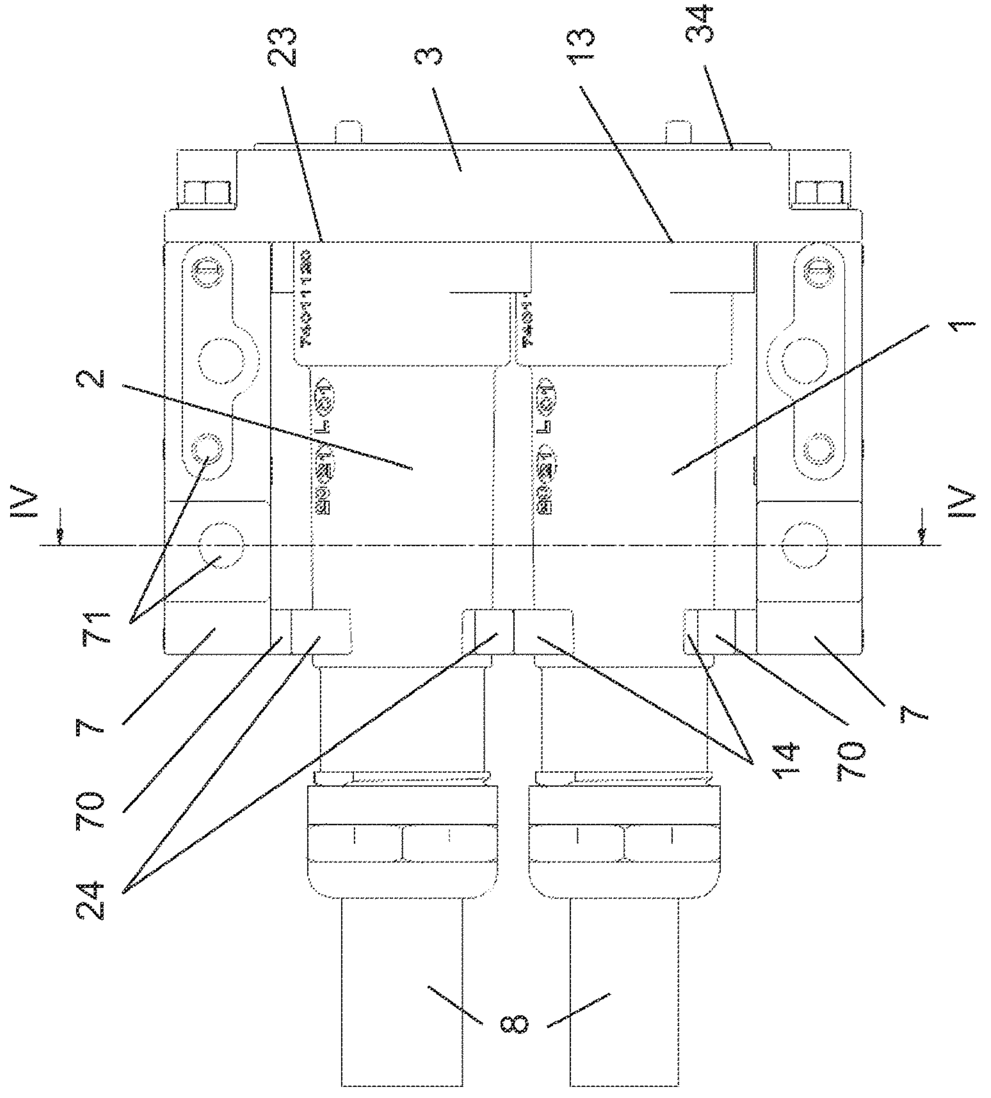
FIG. 3 shows a top view of a connector unit according to one of the previous figures.

FIG. 3 shows a top view of the connector unit. FIG. 4 shows a sectional view along section line IV-IV of FIG. 3. In the following the features of the latching structure 14, 24 of the housings 1, 2 is explained in further details. As it can be seen from FIG. 4 the two latching structures 14, 24 on one housing 1, 2 are arranged mirror symmetrically with regard to the middle axis M1, M2 of the respective housing 1, 2 as it is shown in FIG. 4.

The latching structure 14, 24 comprises at least one groove section 140, 240 and at least one comb section 141, 241. The groove section 140, 240 is provided such that the comb section 141, 241 can engage mechanically into the groove section 140, 240. This means that a mechanical engagement is provided between the groove section 140, 240 and the comb section 141, 241.

In the present embodiment the groove section 140, 240 has a base surface 142, 242 from which two side surfaces 143, 243 extend. The side surfaces 143, 243 are arranged at a distance to each other. In the present case the side surfaces 143, 243 are angularly tilted with respect to the base surface. Furthermore the side surfaces 143, 243 are oriented parallel to each other.

The comb section 141, 241 has a similar structure as the groove section 140, 240. The comb section 141, 241 has a base surface 144, 244 from which to side surfaces 145, 245 extend. The side surfaces 145, 245 are arranged at a distance to each other. In the present case the side surfaces 145, 245 are angularly tilted with respect to the base surface. Furthermore the side surfaces 145, 245 are oriented parallel to each other.

Figure 5:
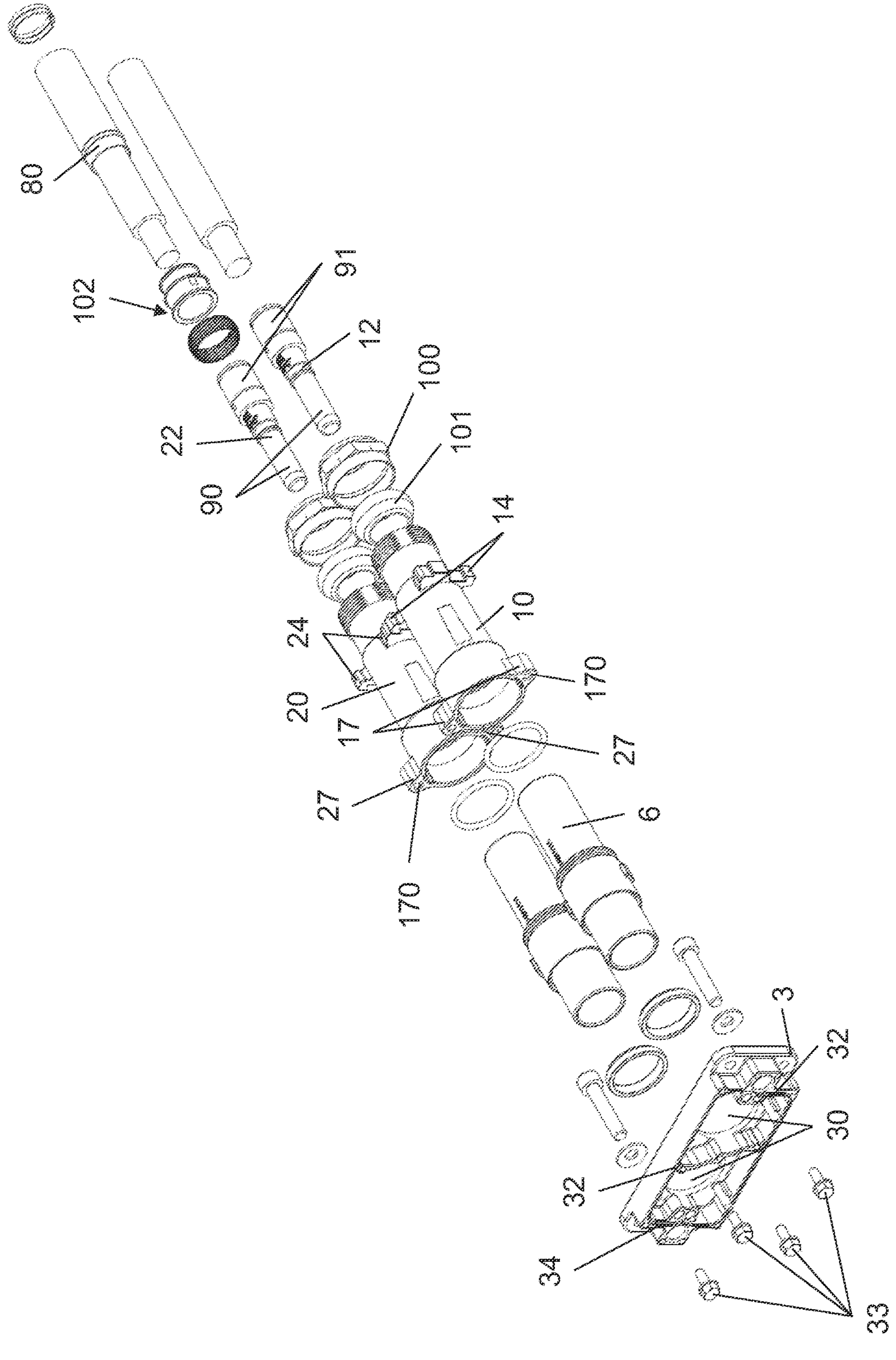
FIG. 5 shows an exploded view of a connector unit according to one of the previous figures configured as plug side.
Figure 6:
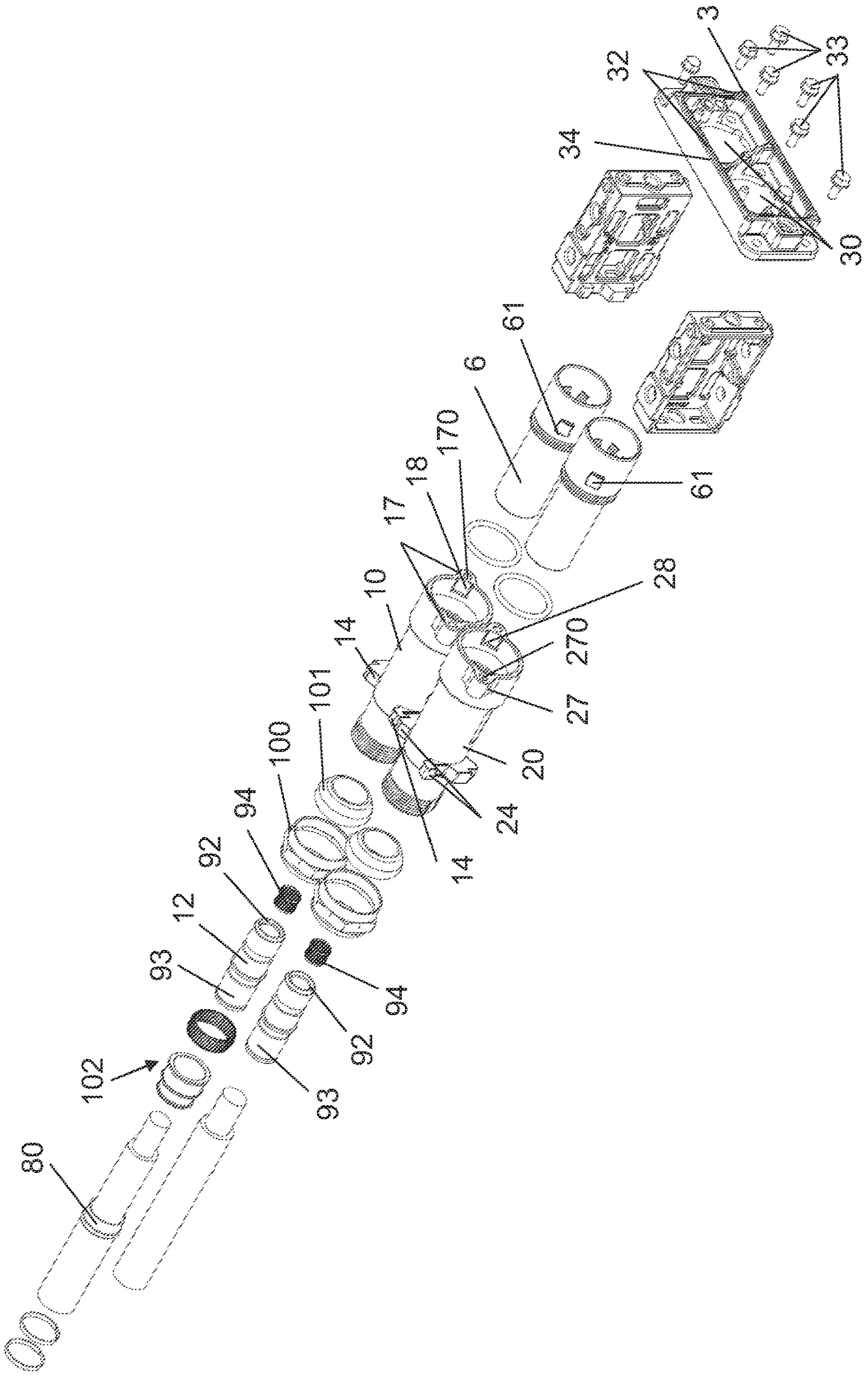
FIG. 6 shows an exploded view of a connector unit according to one of the previous figures configured as pin side.

FIGS. 5 and 6 show an exploded view of the connector unit as shown in the previous figures. FIG. 5 shows pin side and FIG. 6 shows a plug side. From the exploded views as well as from FIGS. 1 and 2 it can be seen that the mounting section 13, 23 has the shape of a flange 17, 27 that extends radially away from the outer side of the housing 1, 2. In the present case there are two flanges 17, 27 arranged on one housing. The flange 17, 27 has in the present case a threaded opening 170, 270. On the side of the mounting element 3 through openings 32 are arranged. A screw 33 is guided through the through opening 32 and engages in into the threaded opening 170, 270.

From the explosion of use of FIGS. 5 and 6 is also shown that the connector unit comprises further a tubular element 6 which is arranged in the interior space 11, 12 of each housing 1, 2. The tubular element 6 is preferably provided from an electrically insulating material. The tubular element 6 encompasses the electrical contact element 12, 22 which are arranged in the housings 1, 2. The tubular element comprises latching elements 60 which engage to the electrical contact elements 12, 22. Hence, the electrical contact elements 12, 22 are held by a mechanical fastening element within the tubular element 6. Furthermore the tubular element 6 comprises an engagement part 61 which extends from the outer surface of the tubular element 6. The engagement part 61 engages into a corresponding recess 18, 28. The recess 18, 28 has an open side which will be closed by the mounting element 3. Due to the engagement of the engagement part 61 into the recess 18, 28 the tubular element 6 is held within the interior space 11, 21. The recess 18, 28 is arranged in the proximity of the flange 17, 27.

In the present embodiment there is also an optional shielding connection structure 102 provided. With the shielding connection structure 102 a shielding braid 80 can be electrically connected to the housing 1, 2.

As seen from the back end 16, 26 a cable 8 is guided into the interior space 11. The cable 8 is secured to the housing

1, 2 by means of a cable gland 100. The cable gland 100 is connected to the housing 1, 2 by means of a threaded connection 101 at the back and 16, 26 of the housing 1, 2. The cable gland 100 can be a standard cable gland 100, which also comprises a sealing element 101 acting on the outer side of the electrical cable 8.

As it can be seen from the FIGS. 1 to 6 the connector unit further comprises an optional side part 7. In the present case there are two side parts 7 arranged on one of the connector units. The other connector unit is not equipped with the side parts 7.

The side parts 7 are mechanically connected to the mounting element 3 and extend in the same direction as the housing 1, 2. The side part 7 has also a latching structure 70 which is provided such that the latching structure 70 can engage with the latching structures 14, 24 of the housings 1, 2. In the present case as shown in FIG. 6 the side part 7 next to the first housing 1 is connected to the first housing 1 and the side part 7 next to the further housing 2 is connected to the further housing 2. The side parts 7 serves as a mounting structure. For that reason the side parts 7 have various openings 71 via which the side parts can be connected to a base element. The base element may be part of a train. Furthermore the openings 71 may also serve as mounting openings for an earthing braid.

Figure 7:
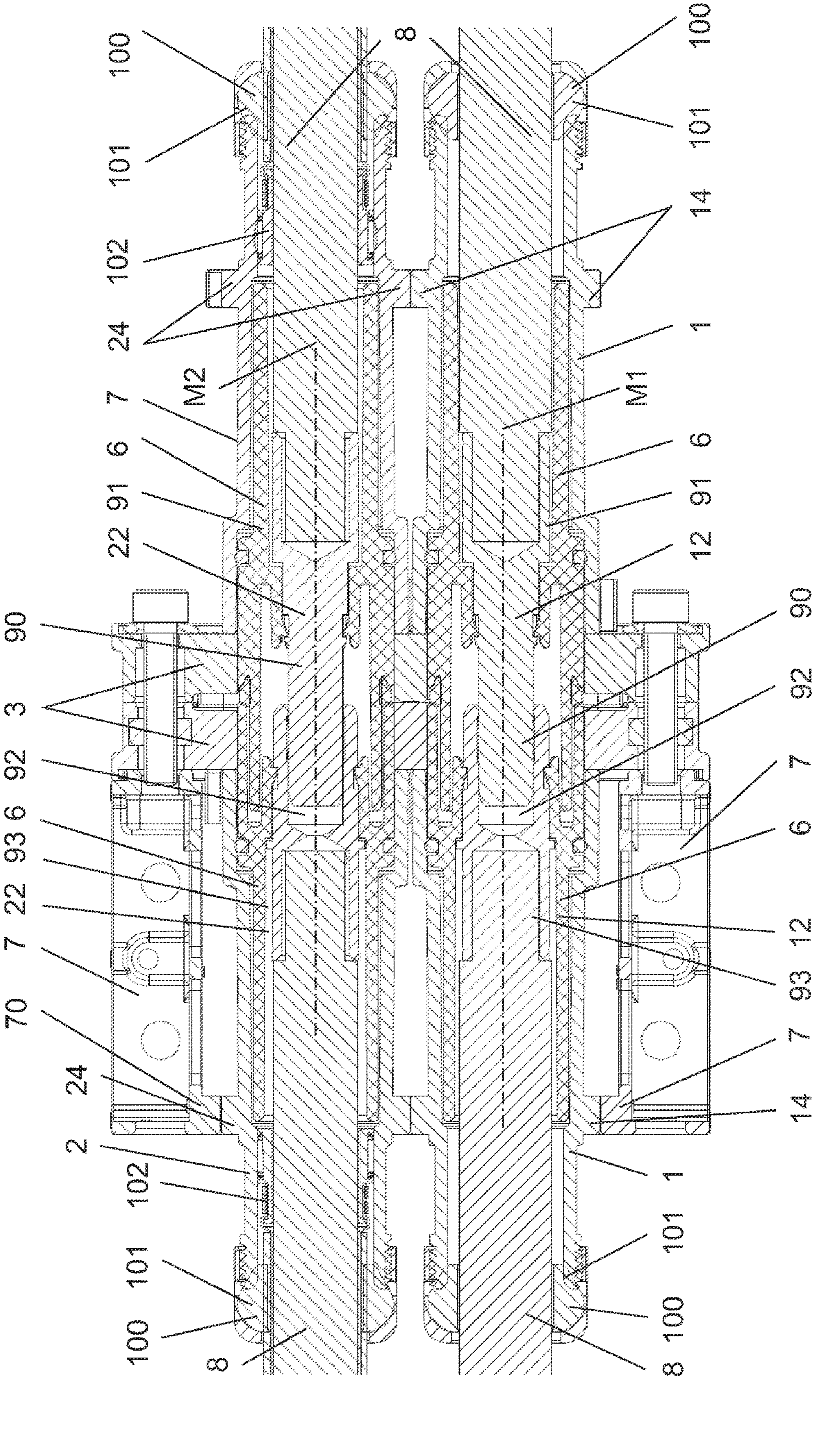
FIG. 7 shows a cross-sectional view of a plug-side connector assembly and the pin-side connector assembly in the connected state.
Figure 8:
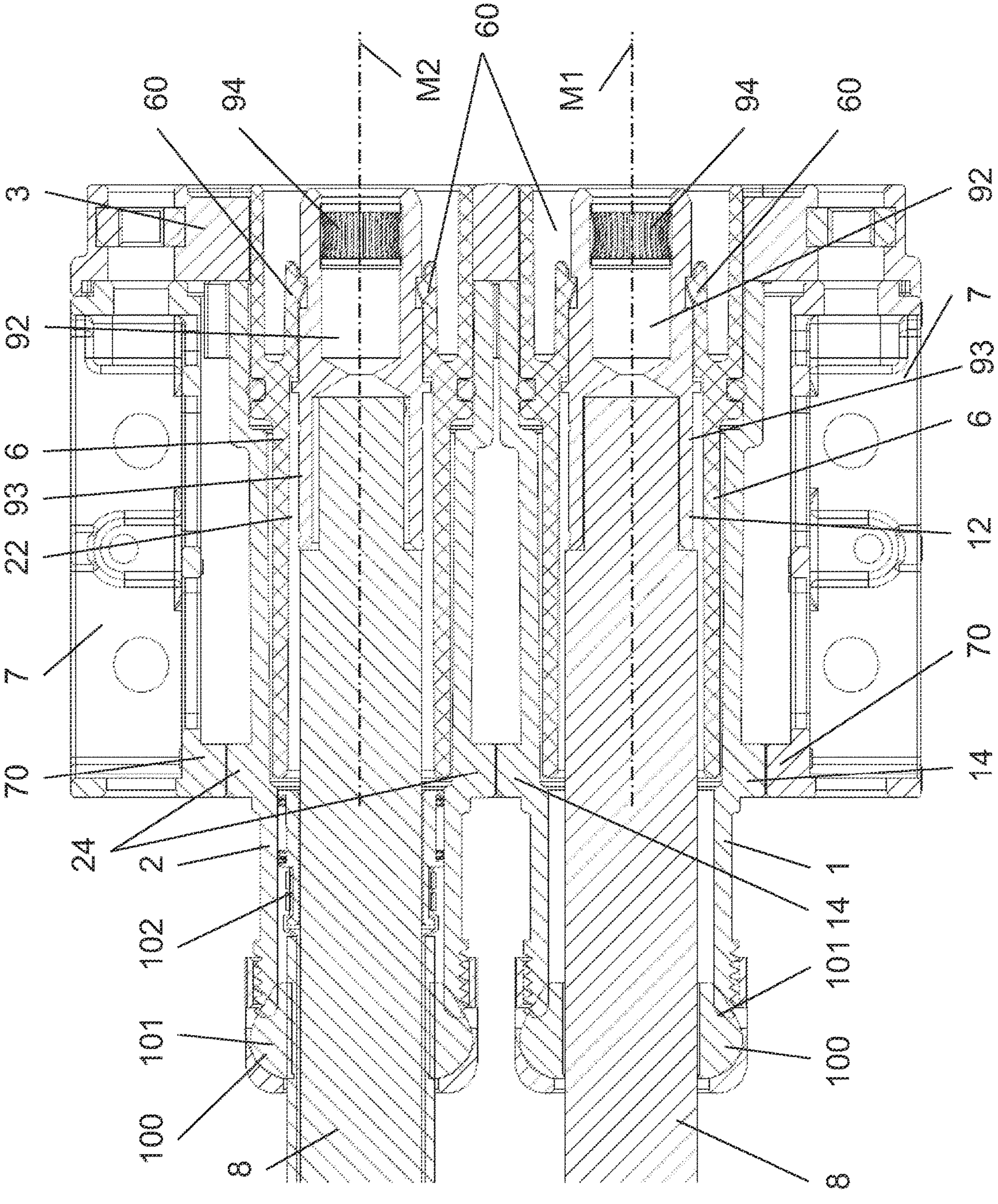
FIG. 8 shows a cross-sectional view of the plug-side according to FIG. 7.
Figure 9:
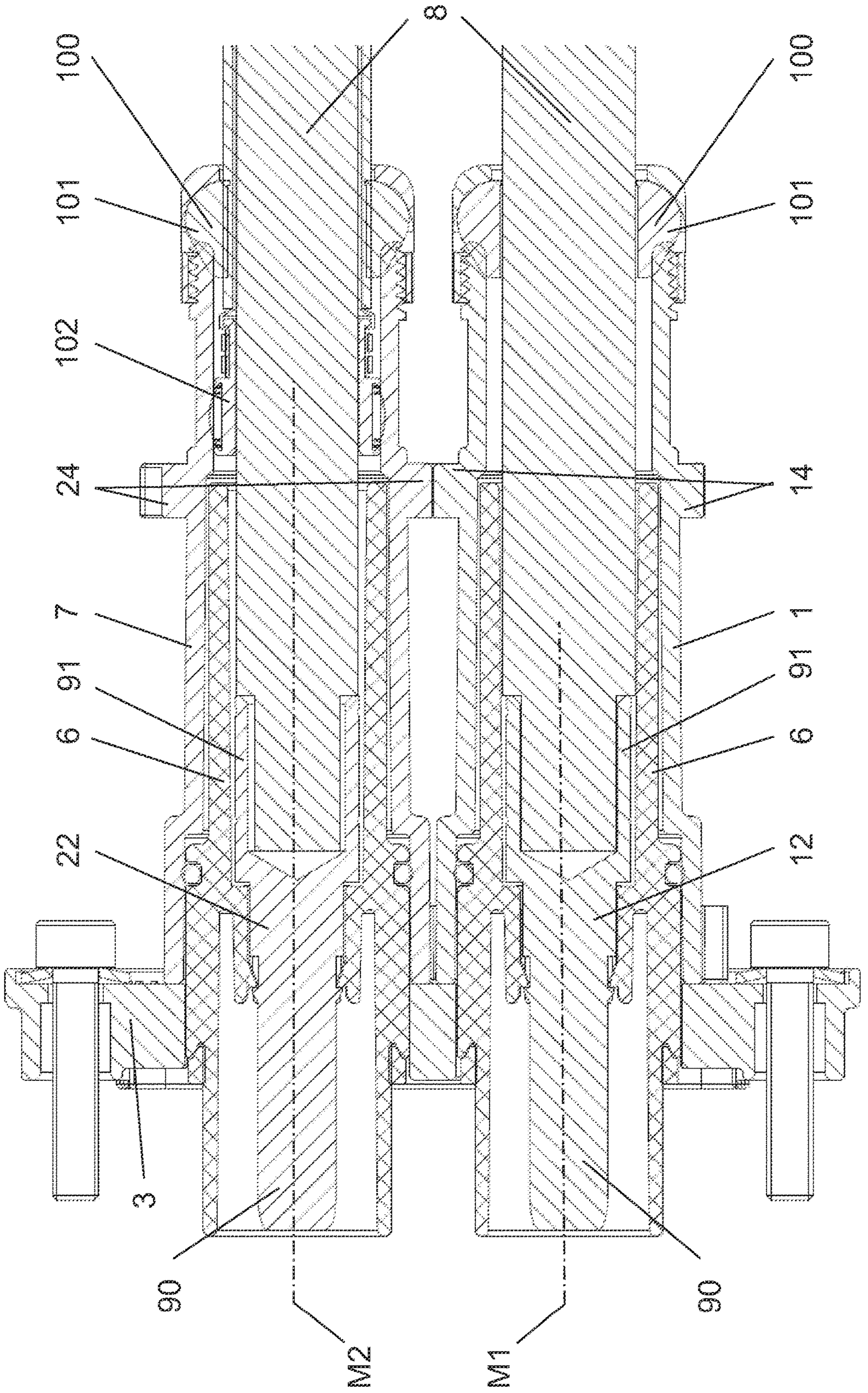
FIG. 9 shows a cross-sectional view of the pin-side according to FIG. 7

FIG. 7 shows a cross-sectional view of a pin side connector assembly comprising a connector unit as described above and a plug side connector assembly also comprising a connector unit as described above. FIG. 8 shows the plug side assembly without the pin side assembly and FIG. 9 shows the pin side assembly without the plug side assembly. The mechanical structure with regard to the connector units, in particular with regard to the mounting element 3, the two housings 1, 2 and the corresponding mechanical connection between the three elements is the same, irrespective whether the connector unit is used in a pin side or a plug side assembly.

The electrical contact element 12, 22 on the pin side as shown in FIG. 9 comprises a pin side contact section 90 and a connection section 91. The electrical contact element 12, 22 on the plug side as shown in FIG. 8 comprises a plug side contact section 92 and a connection section 93. Between the plug side connection section 92 and pin side connection section 91 a contact lamellae 94 is arranged in order to establish an electrical contact. The connection section 91 serves to receive an end of a cable 8 and to electrically connect the cable 8 with the respective electrical contact element. The cable 8 can be crimped to the connection section 91. Alternatively, the cable may be clamped by other means.

Figure 10:
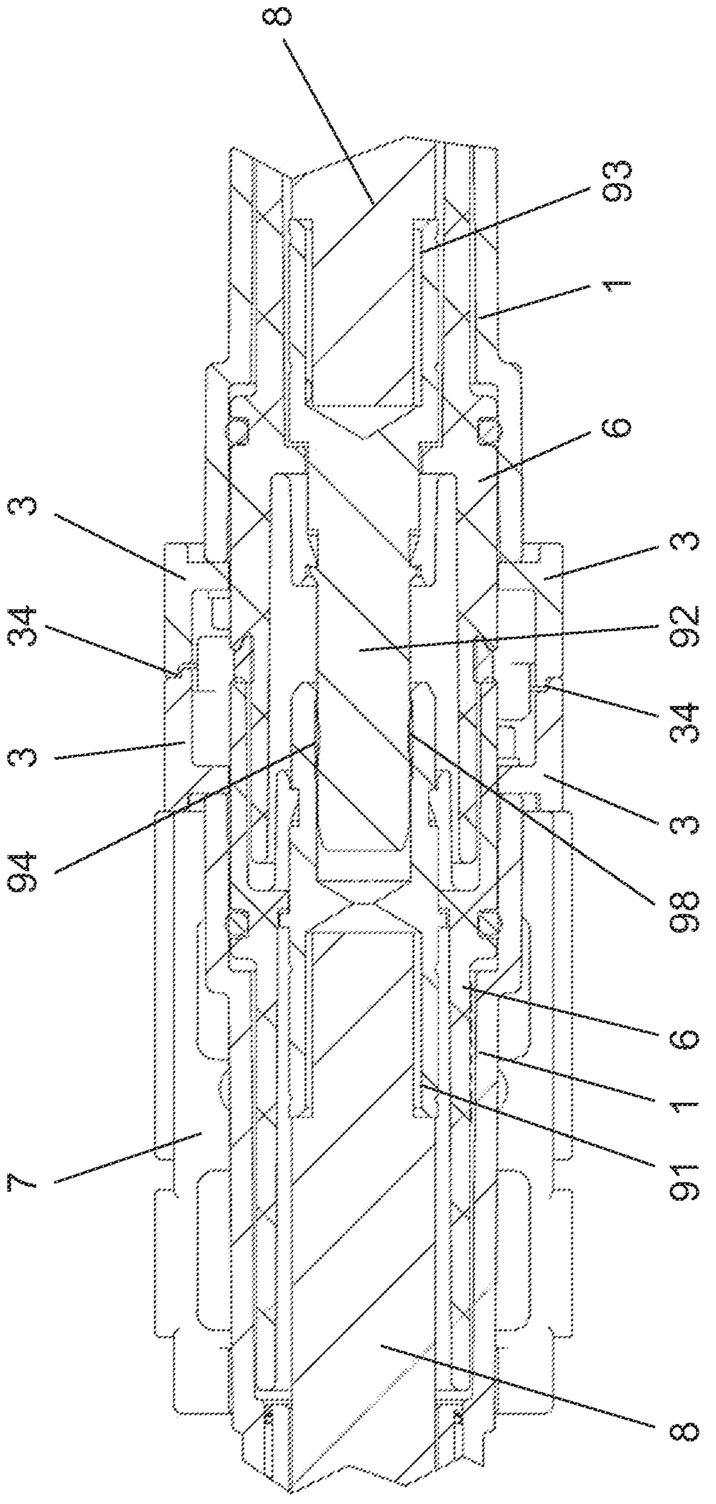
FIG. 10 shows a cross-sectional view of the plug-side connector assembly and the pin-side connector assembly in the connected state.
Figure 11:
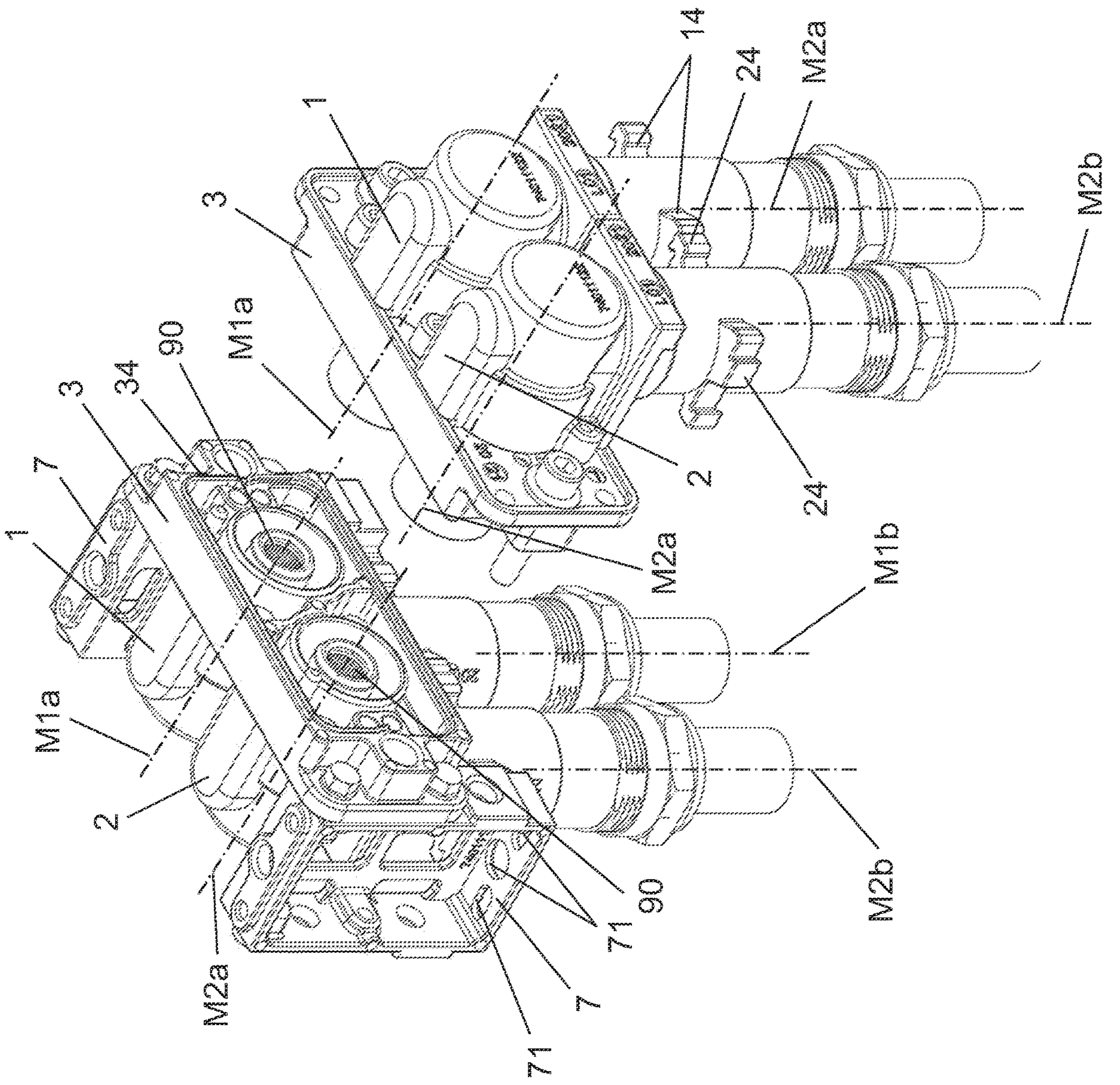
FIG. 11 shows a perspective view of two connector units according to further preferred embodiments of the present invention.
Figure 12:
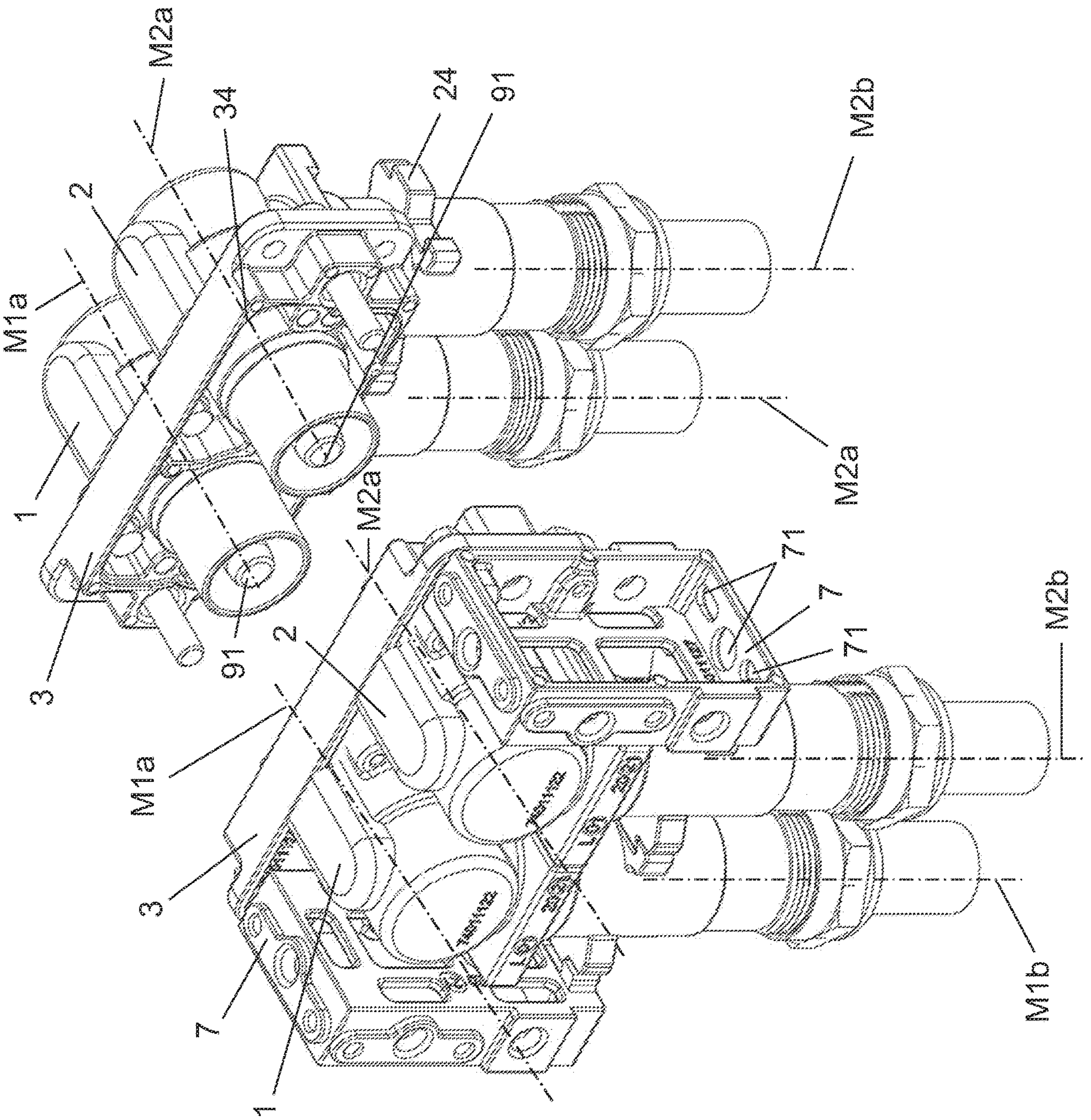
FIG. 12 shows a further perspective view of FIG. 11.

FIG. 10 shows a cross-sectional view of the connector part. From FIG. 10 it can be seen the mounting element 3 of the pin side engages with the mounting element 3 of the plug-side. For the engagement the mounting elements 3 comprises a step-like connection surface 34, via which the two mounting elements 3 are connected mechanically and optionally electrically. Furthermore the risk of an interference from outside parts can be minimized by the step-like connection surface 34.

FIGS. 11 to 14 show further embodiments of the connector units, whereby the middle axes M1, M2 have a bend such that a first part M1*a*, M2*a* of the middle axes M1, M2 extend with an angle angularly tilted to a second part M1*b*, M2*b* of the middle axes. The first part M1*a*, M2*a* extends with an angle of 90° to the second part M1*b*, M2*b*. The overall structure of the connector unit is identical to the connector units according to the previous figures and it is referred to the description above.

The latching structure is arranged in the region of the second part M1*b*, M2*b* of the middle axes. The first part M1*a*, M2*a* of the middle axes M1, M2 is oriented perpendicular to the mounting element 3.

Figure 13:
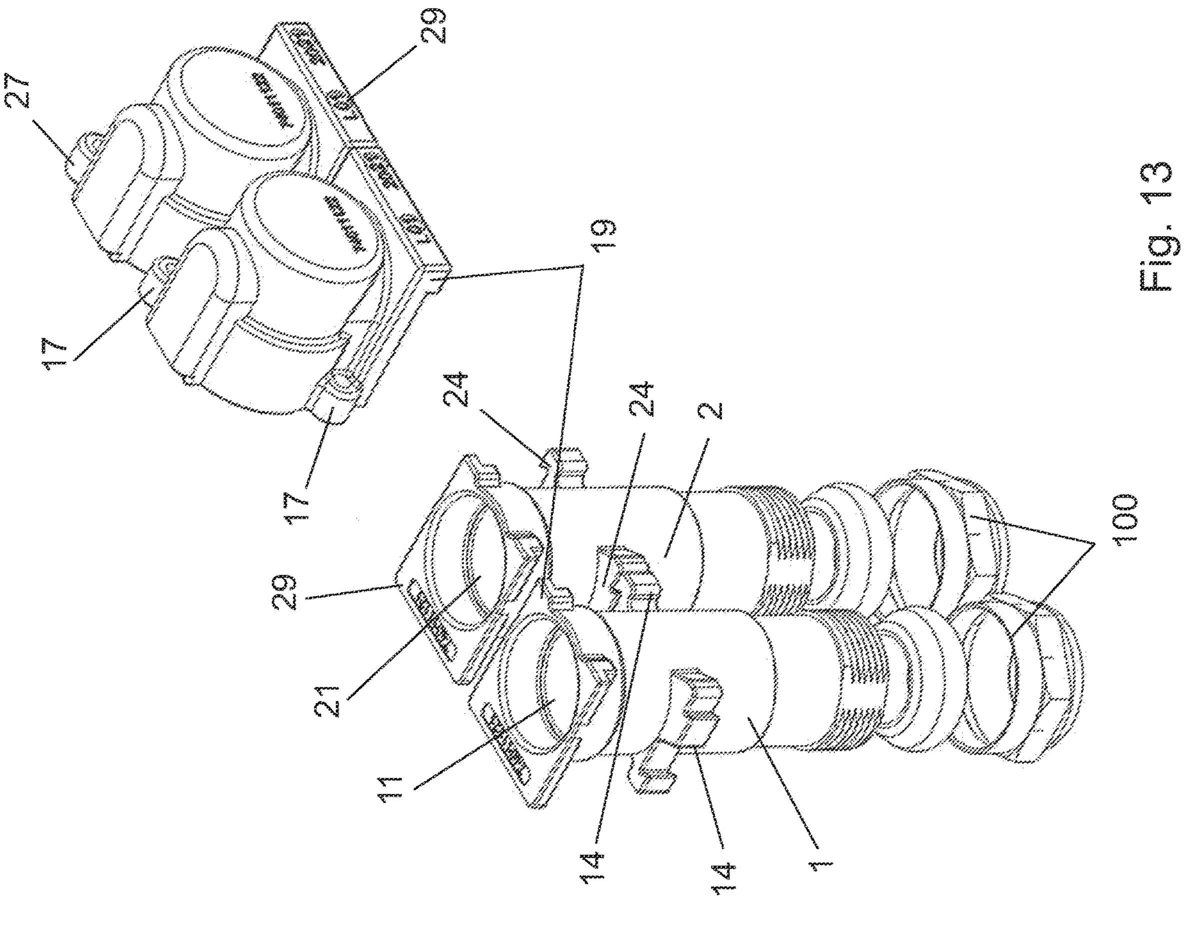
FIG. 13 shows a detailed view of a preferred housing structure of the connector units according to FIGS. 11 to 12.

FIG. 13 shows that the housing may be provided as two part housings which can be mechanically connected with each other. The housings comprise a mechanical connection structure 19, 29.

Figure 14:
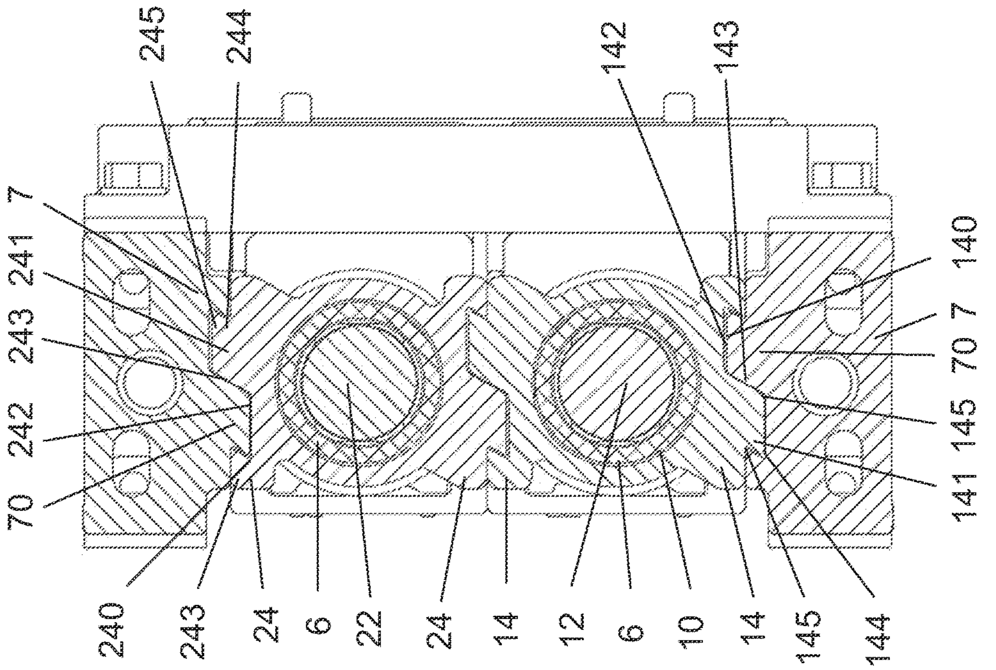
FIG. 14 shows a cross-sectional view through latching structure of the connector units according to FIGS. 11 to 13.
Figure 15:
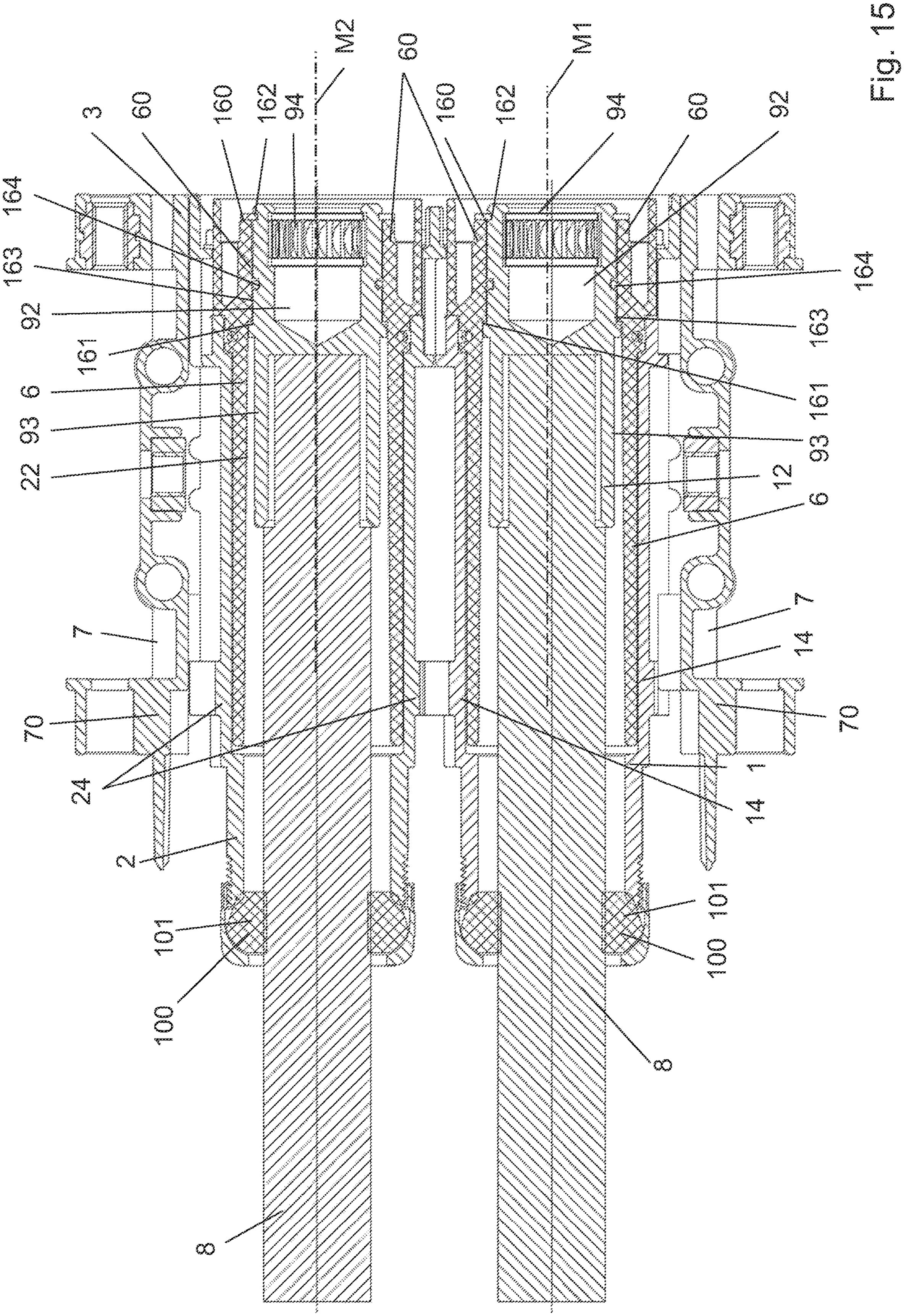
FIG. 15 shows a further embodiment of a plug-side of a connector assembly.
Figure 16:
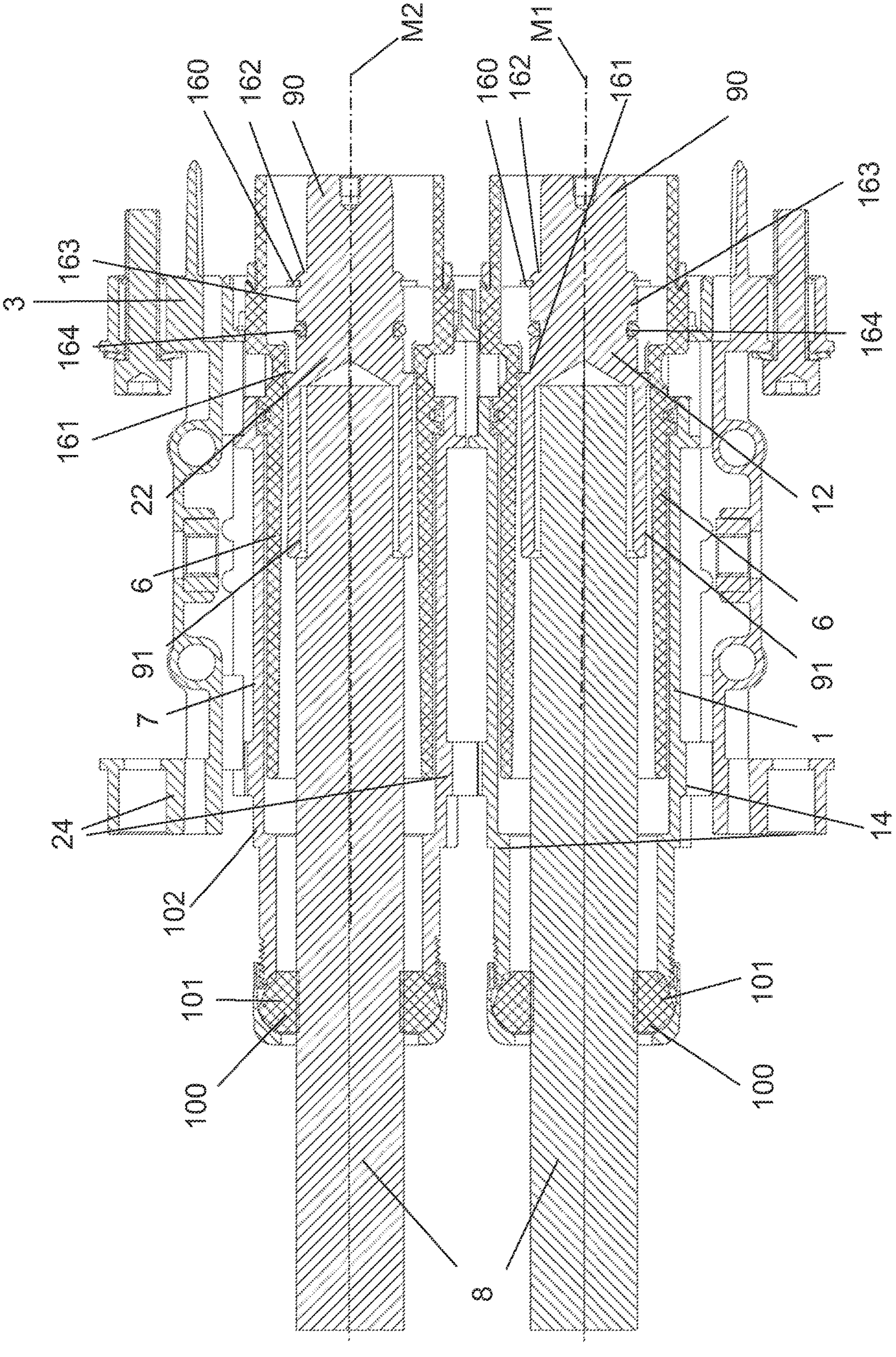
FIG. 16 shows a further embodiment of a pin-side of a connector assembly.

FIGS. 14 and 15 show a further variant, which is similar to the embodiments as shown in FIGS. 1 to 10. The main difference is that in this further variant a locking ring 160 is used instead of the above mentioned latching element 60. The locking ring 160 is placed in a groove 162 on the electrical contact element 12. The electrical contact element 12 further comprises a stop surface 161, which is arranged at a distance from the locking ring 160. The stop surface 161 and the locking ring 160 provide a notch in which an embossment 163 of the tubular element 6 engages. Preferably, a sealing ring 164 is provided between the stop surface 161 and the locking ring 160.

LIST OF REFERENCE SIGNS

| | | | |
|---|---|---|---|
| 1 | first housing | 25 | front end |
| 2 | further housing | 26 | back end |
| 3 | mounting element | 27 | flange |
| 6 | tubular element | 270 | opening |
| 7 | side part | 28 | recess |
| 8 | electrical cable | 29 | mechanical connection structure |
| 10 | sidewall | | |
| 11 | interior space | 30 | opening |
| 12 | electrical contact element | 31 | front surface |
| 13 | mounting section | 32 | through openings |
| 14 | latching structure | 33 | screw |
| 140 | groove section | 34 | connection surface |
| 141 | comb section | 60 | latching element |
| 142 | base surface | 61 | engagement part |
| 143 | side surface | 70 | latching structure |
| 144 | base surface | 71 | openings |
| 145 | side surface | 80 | shielding braid |
| 15 | front end | 90 | pin-side contact section |
| 16 | back end | 91 | connection section |
| 17 | flange | 92 | plug-side contact section |
| 18 | recess | 93 | connection section |
| 19 | mechanical connection structure | 94 | lamellae |
| 170 | opening | 100 | cable gland |
| 20 | sidewall | 101 | sealing element |
| 21 | interior space | 102 | shielding structure |
| 22 | electrical contact element | 160 | locking ring |
| 23 | mounting section | 161 | stop surface |
| 24 | latching structure | 162 | groove |
| 240 | groove section | 163 | embossment |
| 241 | comb section | 164 | sealing ring |
| 242 | base surface | M1 | middle axis |
| 243 | side surface | M2 | middle axis |
| 244 | base surface | M1a, M1b, M2a, M2b | parts of middle axis |
| 245 | side surface | | |

The invention claimed is:

1. A connector unit comprising a first housing having a sidewall encompassing an interior space in which at least one electrical contact element is arranged, at least one further housing having a sidewall encompassing an interior space in which at least one electrical contact element is arranged, and a mounting element having a first opening and at least one further opening, wherein each of said first housing or said further housing comprises a mounting section via which mounting sections said first housing and said further housing are fixedly connected to the mounting element such that said first housing is allocated to a first opening and such that said further housing is allocated to a further opening, wherein each of said first housing or said second housing comprises on the outside of said sidewall a latching structure, wherein said latching structure of said first housing is adapted to be latched in with said latching structure of said further housing in order to establish a mechanical connection between two housings, and wherein the connector unit further comprises tubular elements, wherein at least one tubular element is fixedly arranged in said interior space of each of the housings, wherein the tubular element is made from an electrically insulating material, and wherein the housings and the mounting element are made out of a conductive material, whereby an electrical contact is provided between the housings and the mounting element.

2. The connector unit according to claim 1, wherein concerning a direct connection between two neighbouring housings there is exclusively one single latching connection provided with said latching structure.

3. The connector unit according to claim 1, wherein the mounting section of said housings is arranged at a front end of the respective housing and wherein the latching structure is arranged in the region of the back end of the respective housing.

4. The connector unit according to claim 1, wherein each housing comprises two of said latching structures, comprising a first latching structure arranged on one side of the sidewall and a second latching structure arranged on an other side of the sidewall that is opposite to said one side of the sidewall and/or wherein the two latching structures are arranged mirror-symmetrically with regard to a middle axis which extends through the housing.

5. The connector unit according to claim 1, wherein the latching structure provides a mechanical engagement between the first housing and the further housing such that housings are fixedly connected in terms of a movement perpendicular to middle axes which extend through the housings and wherein the mechanical engagement between the mounting section and the mounting element are fixedly connected in terms of a movement along said middle axes.

6. The connector unit according to claim 1, wherein the latching structure comprises at least one groove section and at least one comb section, whereby the at least one comb section extends into the groove section in the connected state.

7. The connector unit as claimed in claim 1, wherein the latching structure comprises at least one groove section and at least one comb section, whereby the at least one comb section extends into the groove section in the connected state, wherein the groove section has a base surface from which two side surfaces extend, which side surfaces are spaced apart from each other; and/or wherein the comb section has a base surface from which two side surfaces extend, which side surfaces are spaced apart from each other.

8. The connector unit according to claim 1, wherein the mounting section has flanges extending radially away from an outer side of the housing, wherein each of the flanges has an opening via which the first housing or the at least one further housing can be connected to the mounting element with a connection element or by a screw.

9. The connector unit according to claim 1, wherein the electrical contact element is fastened to the tubular element by means of a mechanical fastening element.

10. The connector unit according to claim 1, wherein the electrical contact element is fastened to the tubular element by means of a mechanical fastening element, wherein the mechanical fastening element is at least one latching element to which the electrical contact element can be latched in, wherein the latching element is part of the tubular element; or wherein the mechanical fastening element is a locking ring provided between the tubular element and the electrical contact element.

11. The connector unit according to claim 1, wherein the tubular element has a section with a diameter that corresponds to the diameter of the openings in said mounting element, whereby the tubular element extends into and/or through said opening.

12. The connector unit according to claim 1, wherein the electrical contact element is fastened to the tubular element by means of a mechanical fastening element, wherein the mechanical fastening element is at least one latching element to which the electrical contact element can be latched in, wherein the latching element is part of the tubular element; or wherein the mechanical fastening element is a locking ring provided between the tubular element and the electrical contact element, wherein the tubular element has a section with a diameter that corresponds to the diameter of the openings in said mounting element, whereby the tubular element extends into and/or through said opening.

13. The connector unit according to claim 1, wherein the electrical contact element is fastened to the tubular element by means of a mechanical fastening element, and wherein the tubular element has a section with a diameter that corresponds to the diameter of the openings in said mounting element, whereby the tubular element extends into and/or through said opening.

14. The connector unit according to claim 1, wherein the tubular element is made from a plastic, and whereby the electrical contact, which is provided between the housings and the mounting element, is for shielding and/or earthing purposes.

15. The connector unit according to claim 1, wherein the connector unit further comprises at least one side part, wherein said at least one side part extends from the mounting element in parallel direction to the housings, wherein said at least one side part is mechanically connected to the mounting element, and wherein said at least one side part is mechanically connected to the neighbouring housing.

16. The connector unit according to claim 1, wherein a middle axis extending through each of the housings, respectively, is a straight axis such that the corresponding interior spaces extend along a straight direction; or wherein the middle axis extending through each of the housings, respectively, has a bend such that a first part of each the middle axis extends with an angle angularly tilted to a second part of the middle axis.

17. The connector unit according to claim 1, wherein the housings and the mounting element are made out of a conductive material, whereby an electrical contact is provided between the housings and the mounting element for shielding and/or earthing purposes.

18. A pin-side connector assembly comprising a connector unit according to claim 1, wherein the electrical contact element is a pin-side electrical contact element comprising a pin-side contact section and a connection section to be connected to an electrical cable.

19. The pin-side connector assembly according to claim 18, wherein the pin-side contact section extends over a front surface of the mounting element which front surface is arranged opposite to the housing.

20. A plug-side connector assembly comprising a connector unit according claim 1, wherein the electrical contact element is a plug-side electrical contact element comprising a plug-side contact section and a connection section to be connected to an electrical cable.

21. A connector system comprising a pin-side connector comprising a connector unit according to claim 1, wherein the electrical contact element is a pin-side electrical contact element comprising a pin-side contact section and a connection section to be connected to an electrical cable and a plug-side connector assembly comprising a connector unit according claim 1 wherein the electrical contact element is a plug-side electrical contact element comprising a plug-side contact section and a connection section to be connected to an electrical cable, wherein the mounting element of the pin-side connector assembly is in an electrical contact to the mounting element of the plug-side connector assembly.

22. The connector unit as claimed in claim 7, wherein said side surfaces are oriented parallel to each other and/or wherein at least one of said side surfaces is angularly tilted with regard to the base surface.

23. The connector unit as claimed in claim 15, wherein said at least one side part is also electrically connected to the mounting element.

24. A connector system according to claim 21, wherein the electrical contact is for shielding and/or earthing purposes.

* * * * *